United States Patent
Niebauer et al.

(10) Patent No.: US 9,547,103 B2
(45) Date of Patent: Jan. 17, 2017

(54) GRADIOMETER AND METHOD OF CHANGING AN OPTICAL PATH LENGTH TO DIRECTLY OBTAIN A VALUE OF A GRADIENT OF GRAVITY

(71) Applicant: Micro-g LaCoste, Inc., Lafayette, CO (US)

(72) Inventors: Timothy M. Niebauer, Boulder, CO (US); Fred J. Klopping, Longmont, CO (US); Ryan M. Billson, Loveland, CO (US)

(73) Assignee: Micro-g LaCoste, Inc., Lafayette, CO (US)

( * ) Notice: Subject to any disclaimer, the term of this patent is extended or adjusted under 35 U.S.C. 154(b) by 155 days.

(21) Appl. No.: 14/639,516

(22) Filed: Mar. 5, 2015

(65) Prior Publication Data

US 2015/0177410 A1    Jun. 25, 2015

Related U.S. Application Data

(63) Continuation-in-part of application No. 13/558,138, filed on Jul. 25, 2012, now Pat. No. 8,978,465.

(51) Int. Cl.
| G01V 7/14 | (2006.01) |
| G01V 7/16 | (2006.01) |
| G01B 9/02 | (2006.01) |

(52) U.S. Cl.
CPC .............. *G01V 7/14* (2013.01); *G01B 9/02016* (2013.01); *G01B 9/02021* (2013.01); *G01B 9/02045* (2013.01); *G01V 7/16* (2013.01); *G01B 2290/15* (2013.01)

(58) Field of Classification Search
CPC ......... G01V 7/14; G01V 7/16; G01B 9/02016; G01B 9/02045; G01B 9/02021
USPC ............................................ 73/382 G, 382 R
See application file for complete search history.

(56) References Cited

U.S. PATENT DOCUMENTS

| 7,856,329 | B2 | 12/2010 | Niebauer et al. | |
| 8,931,341 | B2* | 1/2015 | Klopping | G01V 7/14 |
| | | | | 73/382 G |
| 8,978,465 | B2* | 3/2015 | Klopping | G01V 7/14 |
| | | | | 73/382 G |
| 2014/0026654 | A1* | 1/2014 | Klopping | G01V 7/14 |
| | | | | 73/382 G |
| 2014/0224012 | A1 | 8/2014 | Klopping et al. | |
| 2014/0318239 | A1* | 10/2014 | Niebauer | G01V 7/04 |
| | | | | 73/382 R |

OTHER PUBLICATIONS

Robert Goldstein, Electro-Optic Devices in Review, publication, Apr. 1986, 6 pages, FastPulse Technology, Inc., Saddle Brook, New Jersey.
Robert Goldstein, Pockels Cell Primer, article, date unknown— admitted prior art, 7 pages, Reprinted from Laser Focus Magazine.
Newport, Introduction to Laser Frequency Stabilization, Application Note, date unknown—admitted prior art, 5 pages, New Focus, Santa Clara, California.

\* cited by examiner

*Primary Examiner* — Helen Kwok
(74) *Attorney, Agent, or Firm* — John R. Ley (57) ABSTRACT

A gradient of gravity is defined by a change in the optical path length required to maintain equality in optical path lengths of two beam arms which direct light beams to impinge upon and reflect from two freefalling test masses.

23 Claims, 5 Drawing Sheets

GRADIOMETER AND METHOD OF CHANGING AN OPTICAL PATH LENGTH TO DIRECTLY OBTAIN A VALUE OF A GRADIENT OF GRAVITY

CROSS REFERENCE TO RELATED APPLICATION

This is a continuation in part of U.S. patent application Ser. No. 13/558,138, which was filed on Jul. 25, 2012 by the inventors hereof, and which was assigned to the assignee hereof. The subject matter of this prior application is fully incorporated herein by this reference. The subject matter of U.S. application Ser. No. 13/564,548, also filed by the inventors hereof on Aug. 1, 2012, and also assigned to the assignee hereof, is also incorporated herein by this reference.

FIELD OF THE INVENTION

This invention relates to measuring a characteristic of gravity, and more specifically, to a new and improved gradiometer and method which directly measures a change or gradient of gravity without the necessity to perform complex interferometric analysis to calculate the gravity gradient.

BACKGROUND OF THE INVENTION

Gravity is the force of inherent natural attraction between two massive bodies. The magnitude of the gravitational force is directly related to the mass of the bodies and is inversely related to the square of the distance between centers of mass of the two attracted bodies.

Gravity is measured as acceleration, g, usually as a vertical vector component. The freefall acceleration, g, of an object near the surface of the earth is given to a first approximation by the gravitational attraction of a point with the mass of the entire earth, $M_e$, located at the center of the earth, a distance, $R_e$, from the surface of the earth. This nominal gravity value, $g=G \times M_e/R_e^2$, is about 9.8 m/s². Thus, the freefall acceleration due to gravity near the earth's surface of an object having a small mass compared to the mass of the earth is about 9.8 m/s². An instrument used to measure gravity is called a "gravimeter."

The most accurate gravimeters are interferometric absolute gravimeters. The typical interferometric absolute gravimeter uses a freely falling test mass and a laser or single-frequency light beam which reflects from the freefalling test mass. The path length of the reflected beam changes as the test mass tree falls. The reflected light beam is combined with a reference light beam to develop interference fringes. Interference fringes are instances where the amplitude or intensity of the reflected and reference light beams add together to create increased intensity, separated by instances where the two beams cancel or create diminished intensity. Since the freefall movement of the test mass is established by gravity, the occurrence and timing of the resulting interference fringes defines the characteristic of gravity. The use of optical fringe interferometry to measure gravity characteristics is well-known and is described in U.S. Pat. No. 5,351,122.

Fringes occur on a periodic basis depending upon the change in the optical path length of the reflected beam relative to the optical path length of the reference beam. One fringe occurs whenever the optical path difference between the reflected and reference beams changes by the wavelength of the light of the two beams. Movement of the test mass typically changes the beam path length by twice the amount of its physical movement because the physical movement changes both the entry path and exit path of the reflected beam path. In this circumstance, a fringe typically occurs when the object moves by one-half of a wavelength.

A gradient of gravity is the rate at which gravity changes in a certain direction and over a certain distance. A gravity gradient is therefore the change or first derivative of the gravity over distance. An instrument used to measure a gradient of gravity is called a "gradiometer."

Near-field variations or gradients in gravity are caused by localized variations in the mass or density of at least one of the two attracted bodies. For example, gravity gradients are used to establish the location of underground geological structures, such as a pool of liquid petroleum encased within an earth formation, narrow seams or "tubes" of high density geological materials such as diamonds or cobalt, or voids in a geographical formation caused by a tunnel or cavern. These changes in the subterranean material density are most measurable within a relatively short near-field distance, typically within a few hundred meters.

Subsurface density anomalies, for example from valuable nearby high density ore bodies or voids caused by tunnels or areas of low density material, affect the local value of gravity, g, at a level of about 1 part per million ($1/10^6$), and in some cases 1 part per billion ($1/10^9$). The large background of the earth's gravity requires that any direct gravity measurement to detect such subsurface anomalies have a very large dynamic range of parts per billion, otherwise direct gravity measurements will not be useful for locating and detecting such subsurface density anomalies. It is difficult to make gravimeters with such levels of extremely high precision. On the other hand, gradiometers cancel the large effect of the earth's gravity while preserving the ability to detect variations in nearby density anomalies. A gradiometer can have $3 \times 10^5$ times less precision than a gravimeter and still be used effectively to detect or locate nearby mass or density anomalies.

From a logical standpoint, the measurement of a gravity gradient ($\gamma$) is obtained by measuring the gravity values (g) at the different locations, subtracting the gravity measurements, and dividing the result by the distance (d) between the locations, i.e. $\gamma=(g_2-g_1)/z$. This quantity is referred to mathematically as the spatial derivative of gravity in the vertical direction. From a practical standpoint, this approach requires a relatively complex mathematical interferometric analysis of the fringes to obtain the gravity values at each location.

Another approach, also from a logical standpoint, is to interferometrically combine the light beam from one gravity measurement with the light beam from the other gravity measurement to create fringes. The number of fringes represents the gradient or differential in gravity. The practical difficulty with this approach is that the difference in the number of fringes is typically in the neighborhood of no more than one fringe, when the test masses move over a distance which can be accommodated by a reasonably sized commercial product. Obtaining an accurate value of the gravity gradient when that value is represented by a single fringe or less than one fringe is very difficult or impossible. The extent of mathematical processing required is extensive and complex, and the accuracy is compromised.

One approach to creating more than one fringe when measuring the gradient of gravity, is to impart a velocity difference between the two freefalling test masses. The test mass with the higher velocity will move a greater distance during freefall than the test mass with the lesser velocity, causing the reflected light beam to traverse a longer beam path. Because the number of fringes generated is related to the difference in the path lengths of the beams, the greater relative difference in the distance of test mass movement results in more fringes. The greater number of fringes makes the interferometric calculation more reliable and accurate, but nevertheless adds complexity to the mathematical calculations.

The size of the gradiometer instrument required to impart an initial velocity difference between the two freefalling test masses is increased, because of the necessity to accommodate the greater freefall distance of the faster moving test mass. Furthermore, the equipment required to impart the initial velocity difference is more complex, as our the requirements for determining when both test masses commence simultaneous freefall. These practical operational requirements, plus the added complexity in interferometric analysis and calculation, adds to the complexity of previous interferometric gradiometers.

SUMMARY OF THE INVENTION

This invention permits the gradient of gravity to be directly measured from an interferometric combination of light beams reflected from two freefalling test masses, without the need for complex mathematical processing of interferometrically generated fringes. Indeed, the invention also permits an accurate and direct measurement of the gradient of gravity under circumstances one or less than one fringe is generated. The invention also avoids the need and complexity of imparting an initial velocity to one of the test masses. The present invention also reduces the freefall distance required to obtain an accurate measurement of the gravity gradient. The invention further simplifies and makes more compact, from a physical size standpoint, the gradiometer used to measure the gradient of gravity.

The invention achieves these improvements while simultaneously achieving a high level of common mode rejection of a variety of error-inducing adverse influences, including those caused from physical perturbation, vibration, and angular rotation of freefalling test masses. The improvements of the invention, coupled with its direct measurement capability, makes it practical and convenient to use the present gradiometer in many commercial and industrial applications where the use of previous gradiometers was more difficult or problematic. These and other features and benefits are achieved by different aspects of the invention, which are generally summarized below.

One aspect of the invention involves a gradiometer for measuring a gradient of gravity between two predetermined separated locations using first and second light beams. First and second test masses are released for simultaneous freefall solely under the influence of gravity with each test mass at a different one of the two separated locations. An arrangement of optical elements directs the first and second light beams to traverse first and second separate and different beam arms respectively. Each beam arm has an optical path length along which the light beams traverse. The first beam arm directs the first light beam to impinge upon and reflect from at least the first test mass during the simultaneous freefall of both test masses. The second beam arm directs the second light beam to impinge upon and reflect from at least the second test mass during the simultaneous freefall of both test masses. The arrangement of optical elements interferometrically combines the first and second light beams into an output light beam after the first and second light beams have traversed the first and second beam arms during the simultaneous freefall of test masses. A dynamic optical path length adjusting element is located within one of the beam arms and is operative in response to an applied control signal applied to change the optical path length of the one beam arm in a predetermined relation to a magnitude of the applied control signal. An optical path control system is receptive of the output light beam while the test masses freefall simultaneously and supplies the control signal at a magnitude which causes the dynamic optical path length adjusting element to maintain the optical path length of the one beam arm equal to the optical path length of the other beam arm during the simultaneous freefall of the test masses. The magnitude of the control signal directly defines the gradient of gravity.

Another aspect of the invention involves a method of measuring a gradient of gravity between two predetermined separated locations. A first test mass is allowed to freefall solely under the influence of gravity at one of the separated locations, and a second test mass is allowed to freefall solely under the influence of gravity at the other the separated location and simultaneously during at least a portion of the time when the first test mass is freefalling. A first light beam is directed in a first beam arm to impinge upon and reflect from at least the first test mass during simultaneous freefall of both test masses. A second light beam is directed in a second beam arm to impinge upon and reflect from at least the second test mass during simultaneous freefall of both test masses. The first and second beam arms each have an optical path length. The optical path length of one beam arm is changed to maintain its optical path length equal to the optical path length of the other beam arm during the simultaneous freefall of the test masses. The gradient of gravity is defined by the magnitude of the change in the optical path length of the one beam arm required to maintain equality in the optical path lengths of the first and second beam arms.

Subsidiary features of one or both of these aspects of the invention include some or all of the following. The first and second light beams from the first and second beam arms are combined into an output light beam after both light beams have impinged upon and reflected from the test masses during simultaneous freefall of the test masses, and a characteristic the output light beam is used to change the optical path length of the one beam arm to maintain the optical path lengths of the beam arms equal to one another during simultaneous freefall of the test masses. A characteristic the output light beam at the commencement of simultaneous freefall is compared with a characteristic of the output light beam while the test masses freefall simultaneously to control the change in the optical path length of the one beam arm to maintain the equality in length. The first and second test masses freefall in paths which are parallel to one another, and the first and second beam arms extend parallel to one another and to the freefall paths of the test masses. The optical path length of the first and second beam arms is equally changed from any spurious rotation of either test mass during freefall. The first and second light beams are supplied to the first and second beam arms at the same frequency. The first and second light beams each impinge upon and reflect from both the first and second test masses during the simultaneous freefall. The first beam arm directs the first light beam to impinge upon and reflect from a location on the first test mass in the direction of freefall and from a location on the second test mass in the opposite direction of freefall, and the second beam arm directs the second light beam to impinge upon and reflect from a location on the first test mass in the opposite direction of freefall and from a location on the second test mass in the direction of freefall.

A more complete appreciation of the present invention and its scope may be obtained from the accompanying drawings, which are briefly summarized below, from the following detailed description of presently preferred embodiments of the invention, and from the appended claims.

DETAILED DESCRIPTION

Figure 1:
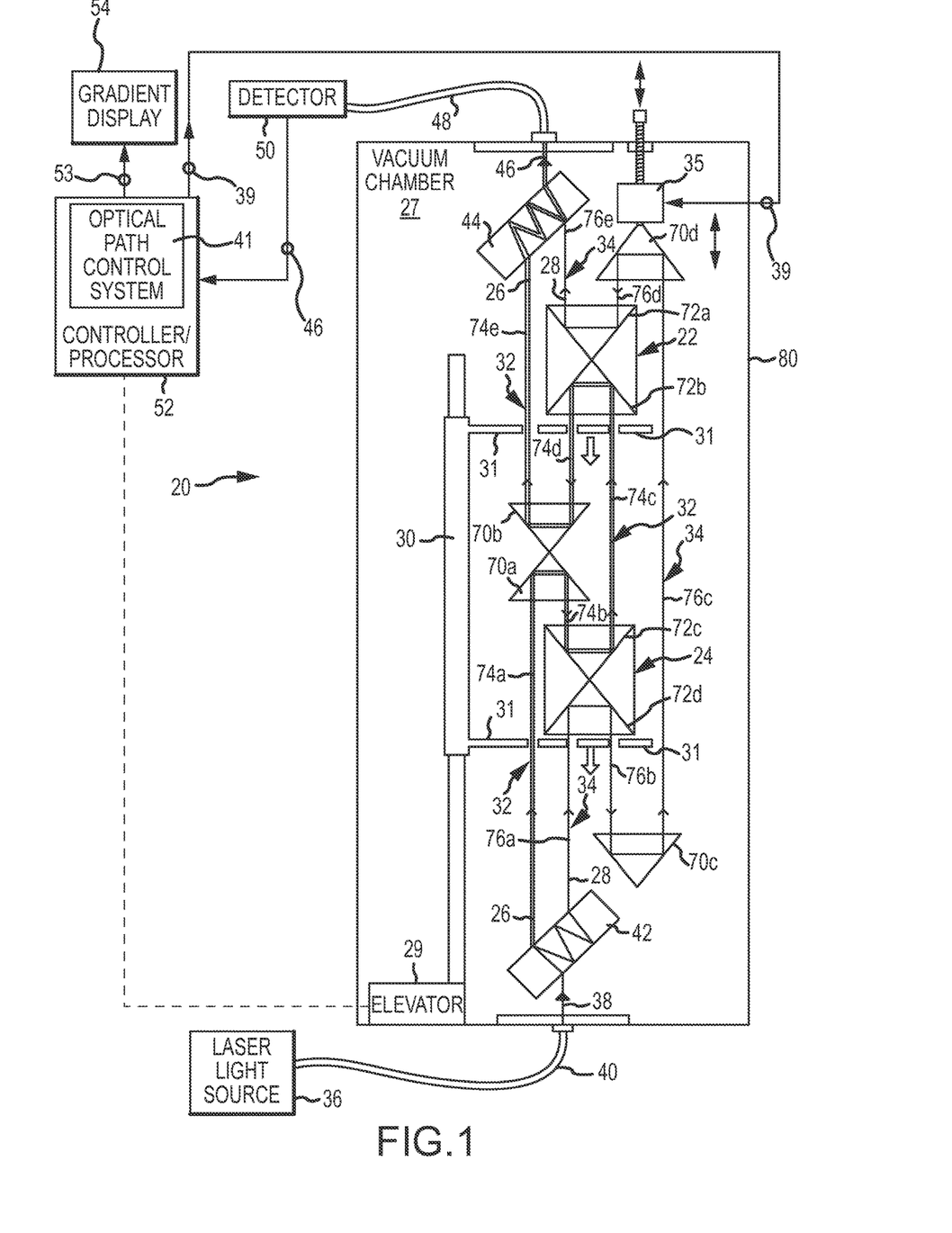
FIG. 1 is a generalized block and schematic diagram of one embodiment of an interferometric gradiometer which incorporates the present invention.
Figure 2:
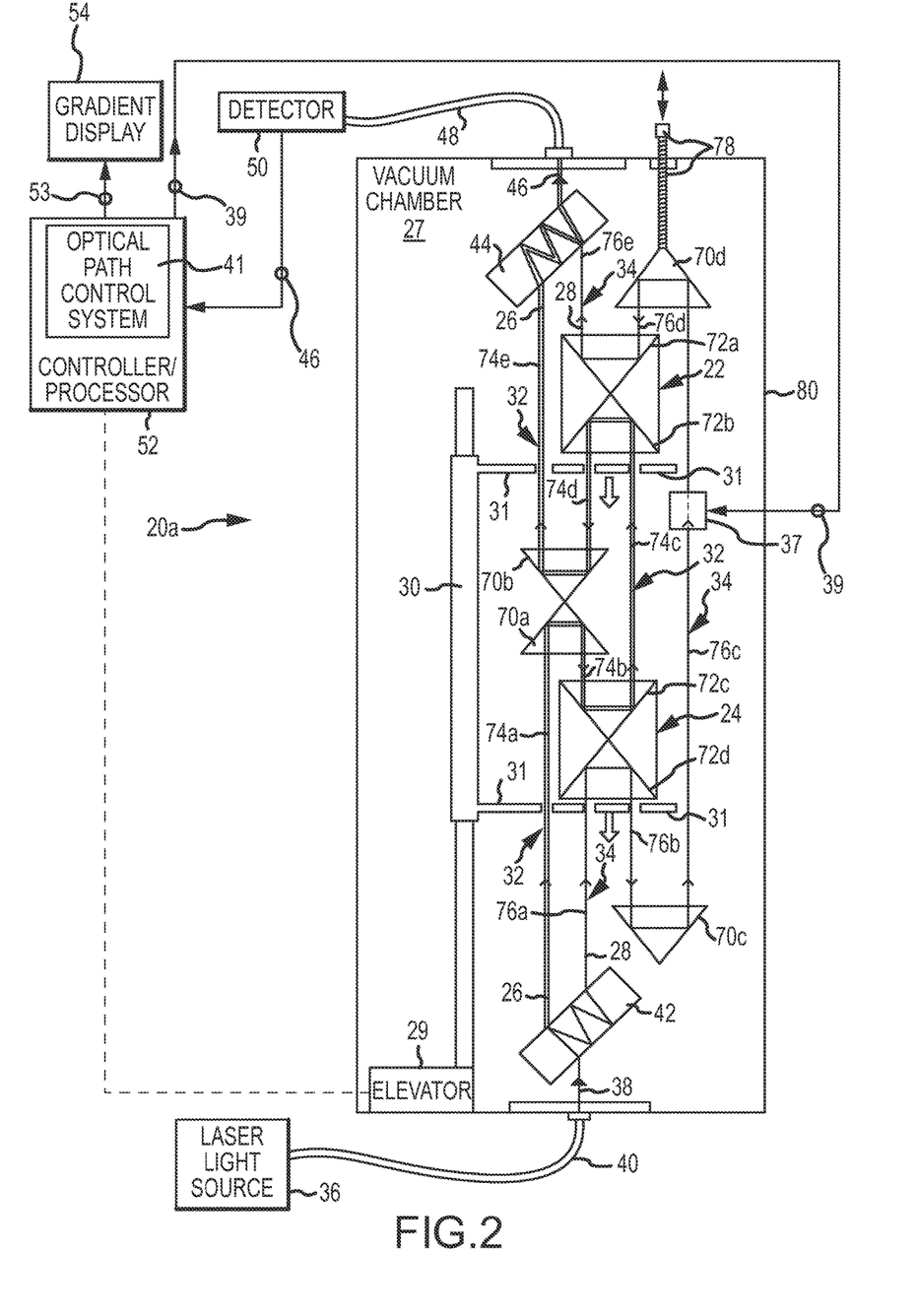
FIG. 2 is a generalized block and schematic diagram of another embodiment of an interferometric gradiometer which incorporates the present invention.

The present invention is embodied in each of two optical interferometric gradiometers 20 and 20a, shown in FIGS. 1 and 2. The optical gradiometers 20 and 20a are used to measure a gradient of gravity. The gradient of gravity is represented by the relative difference in gravity experienced by two test masses 22 and 24 when they are released to freefall simultaneously only under the influence of gravity. The force of gravity acting on the lower test mass 24 is very slightly greater than the force of gravity acting on the upper test mass 22, since the lower test mass 24 is closer to the center of the earth's mass and therefore experiences a slightly greater gravitational force. A slight difference between the forces of gravity acting on the test masses 22 and 24 constitutes a gradient of gravity which is measured in accordance with the present invention.

The slightly greater gravity on the lower test mass 24 causes it to experience a slightly greater downward acceleration compared to the downward acceleration of the upper test mass 22 during simultaneous freefall. The slightly greater acceleration of the lower test mass 24 causes a slight increase in the downward velocity of the lower test mass 24 compared to the downward velocity of the upper test mass 22. The slightly greater velocity of the lower test mass 24 compared to a slightly lesser velocity of the upper test mass 22 slightly increases the physical separation between the two test masses 22 and 24 at the end of their simultaneous freefall compared to the physical separation of the test masses 22 and 24 at the beginning of their simultaneous freefall.

Light beams 26 and 28 each impinge upon and reflect from each of the test masses 22 and 24 during their simultaneous freefall. The light beams 26 and 28 traverse optical paths referred to herein as beam arms 32 and 34, respectively. The beam arms 32 and 34 are oriented to cause each light beam 26 and 28 to impinge on and reflect from both test masses 22 and 24. The increasing physical separation between the test masses 22 and 24 during simultaneous freefall causes the optical path length of the beam arm 32 to increase while the optical path length of the beam arm 34 decreases, as understood from the following detailed explanation. The extent of change of the optical path lengths of the beam arms 32 and 34 directly correlates to the gradient of gravity.

Without using the present invention, the change in the relative lengths of the beam arms 32 and 34 would create a changing relative phase relationship of the light beams 26 and 28 exiting the beam arms 32 and 34. However, the present invention employs a dynamic optical path length adjusting element 35 (FIG. 1) or 37 (FIG. 2) in at least one of the beam arms, e.g. beam arm 34, to equalize the optical path lengths of the beam arms 32 and 34 during simultaneous freefall of the test masses 22 and 24. The dynamic optical path length adjusting elements 35 and 37 adjusts the optical path length of the beam arm 34 (as shown) to keep it equal to the optical path length of the beam arm 32 during simultaneous freefall of the test masses 22 and 24.

A control signal 39 controls the dynamic optical path length adjusting elements 35 and 37 to adjust the optical path length of the beam arm 34. The dynamic optical path length adjusting element 35 shown in FIG. 1 is an electro-mechanical element which physically changes in dimension to change the position of a retroreflector 70d in the beam arm 34, thereby physically changing the optical path length traversed by the light beam 28. The dynamic optical path length adjustment element 37 shown in FIG. 2 is an electro-optical element which optically controls the time and phase of propagation of the light beam 28 through the element 37 and thus through the beam arm 34, thereby optically changing the optical path length traversed by the light beam 28.

Figure 3:
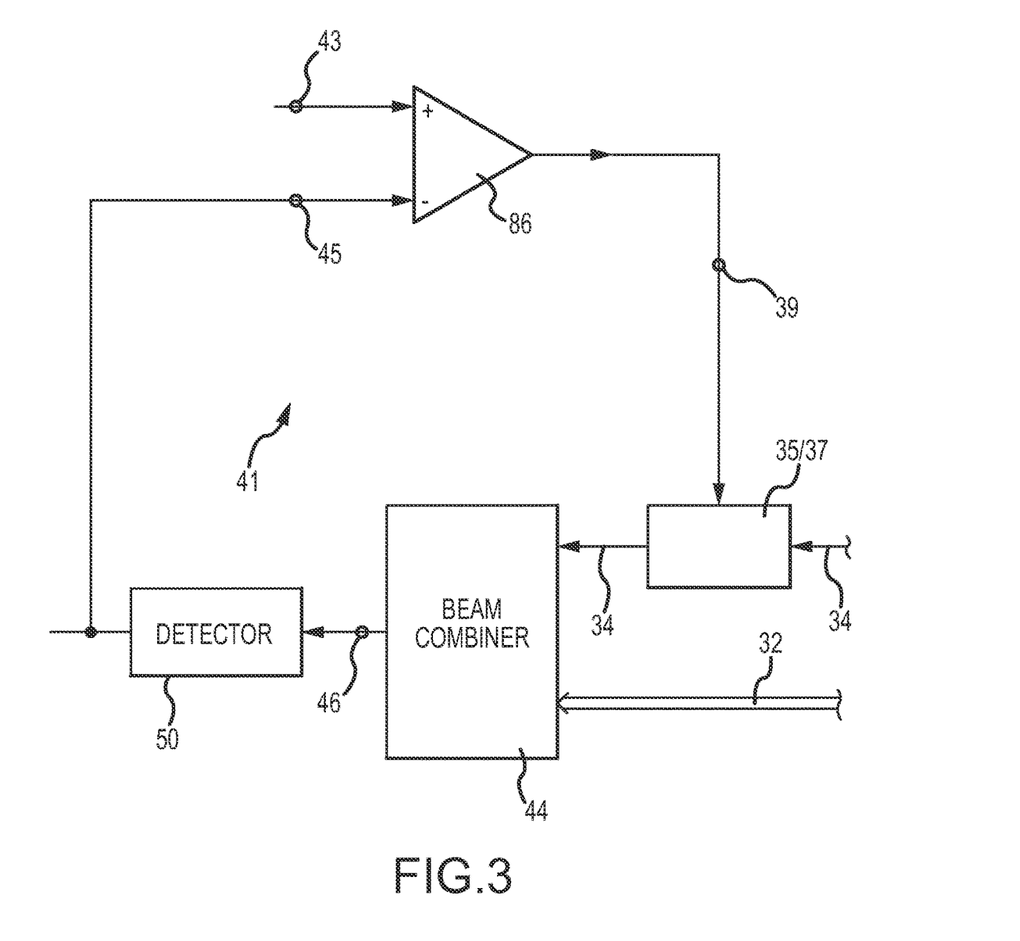
FIG. 3 is a schematic, functional and logic diagram of a basic optical path control system used to establish and maintain equal optical path lengths in the gradiometers shown in FIGS. 1 and 2.

The control signal 39 is derived and supplied by an optical path control system 41, shown in FIG. 3, which responds to a reference value 43 derived from the light intensity of a combination of the light beams 26 and 28 at an instant in time when the test masses 22 and 24 freefall simultaneously. The control system 41 also responds to a dynamic value 45 derived from the light intensity of a combination of the light beams 26 and 28 while the test masses 22 and 24 continue their simultaneous freefall, and the optical path length of the beam arm 34 is adjusted to maintain equality with the optical path length of the beam arm 32. The control signal 39 adjusts the optical path length of the beam arm 34 to maintain it equal in optical path length to that of the beam arm 32 during the simultaneous freefall of the test masses 22 and 24, and the dynamic value 45 is a feedback signal which represents the effect of the control signal 39 in achieving and maintaining the equality in optical path lengths. The feedback control system 41 derives the magnitude of the control signal 39 from the difference between the dynamic value 45 and the reference value 43, using conventional feedback principles.

The magnitude of the control signal 39 directly represents the gradient of gravity, because the magnitude of the control signal 39 directly correlates to the slightly increased separation between the two freefalling test masses 22 and 24 caused by the different values of gravity acting on each test mass during simultaneous freefall. Because the value of the control signal 39 directly correlates to the gradient of gravity, it is not necessary to perform complex interferometric analysis and calculations to obtain the value of the gradient of gravity. The control signal 39 directly correlates to the gradient of gravity value.

Deriving an accurate value of the gravity gradient from the control signal 39 does not depend on generating a fringe, unlike typical interferometric analysis which typically requires the generation of multiple fringes to obtain enough accuracy for a reliable measurement. When the test masses 22 and 24 are released simultaneously to freefall, the increase in distance between the two freely falling test masses 22 and 24 might be so slight that less than one interference fringe 60 (FIG. 4) would be generated during the entire course of simultaneous freefall. Attempting an accurate measurement from only one, or less than one, interference fringe 60 is very difficult or impossible using conventional statistical fitting interferometry techniques. The present invention is capable of deriving a reliable measurement of the gradient of gravity under circumstances where interferometric processing would not yield a reliable measurement or where a reliable measurement would be available only after performing complex mathematical calculations and processing.

The details of the present invention are described below. Most of these details are common to both embodiments 20 and 20a shown in FIGS. 1 and 2, respectively.

The light beams 26 and 28 traverse the beam paths 32 and 34 within a vacuum chamber 27 defined by a housing 80 of the gradiometers 20 and 20a. The vacuum within the chamber 27 reduces the aerodynamic drag on the test masses 22 and 24 when they freefall. An elevator 29, an elevator frame 30 and support devices 31 support the test masses 22 and 24, release the test masses 22 and 24 to fall freely, simultaneously and solely under the influence of gravity, and catch the test masses 22 and 24 at the end of their simultaneous freefall.

The light beams 26 and 28 within the beam arms 32 and 34 are derived from a single constant-frequency light source 36, such as a laser. A single input light beam 38 from the light source 36 is conducted through an optical fiber 40 to a beam splitter 42, and the beam splitter 42 creates the two light beams 26 and 28. Consequently, the light beams 26 and 28 in the beam arms 32 and 34 have essentially the same frequency characteristic. Using two light beams 26 and 28 which are derived from the same initial frequency is an important aspect of the functionality described herein. As an alternative to conducting the input light beam 38 through the optical fiber 40, mirrors could be used or the optical fiber 40 could be eliminated altogether by directly connecting the light source 36 to the housing 80 and directly injecting the light beam 38 into the gradiometer 20 or 20a.

After traversing the beam arms 32 and 34, the light beams 26 and 28 are combined in a beam combiner 44. The beam combiner 44 supplies an output light beam 46 which contains the information resulting from the interferometric combination of the light beams 26 and 28. An optical fiber 48 conducts the output light beam 46 to a conventional detector 50. As an alternative to using the optical fiber 48, mirrors could be used or the optical fiber 48 could be eliminated altogether by directly connecting the detector 50 to the housing 80 to directly receive the output light beam 46 from the combiner 44.

The detector 50 generates signals which correspond to the characteristics of the output light beam 46 including the intensity or magnitude of light resulting from the combination of the light beams 26 and 28. A controller/processor 52 responds to signals from the detector 50. The controller/processor 52 incorporates the optical path control system 41 (FIG. 3) or executes software instructions which emulate the optical path control system 41, to cause the dynamic optical path length adjusting elements 35 (FIG. 1) and 37 (FIG. 2) to establish and maintain the optical path length of the beam arm 34 equal to the optical path length of the beam arm 32. The controller/processor 52 supplies a scaled version of the control signal 39 as a display signal 53 to a display 54. The display 54 presents information contained in the display signal 53 which describes the gradient of gravity. The information in the display signal 53 is directly related to the magnitude of the control signal 39 at the end of simultaneous freefall of the test masses.

The geometry and optical components of the beam arms 32 and 34 include four conventional open corner cube retroreflectors 70a-70d positioned within the vacuum chamber 27. The retroreflectors 70a, 70b and 70c are fixed in position, and the retroreflector 70d is adjustable in position due mechanical positioning created by a micrometer screw 78. The position of the retroreflector 70d is also variable because of the effects of the electro-mechanical dynamic optical path length adjusting element 35 (FIG. 1), operating in response to the control signal 39.

The test masses 22 and 24 each include upward facing open retroreflectors 72a and 72c and downward facing open retroreflectors 72b and 72d, respectively. The downward facing retroreflectors 72b and 72d face in the same direction that the test masses freefall, and the upward facing retroreflectors 72a and 72c face in the opposite direction from the direction that the test masses 22 and 24 freefall. The retroreflectors 72a, 72b and 72c, 72d are connected as a part of the test masses 22 and 24, respectively.

The retroreflectors can also be of the conventional closed variety. A closed retroreflector is constructed of a body of solid glass or other high-grade transparent optical material. The reflective wall surfaces are machined or otherwise formed on the body of the retroreflector. The reflective wall surfaces are coated with a reflective material to reflect light impinging on the wall surfaces. An incident light beam passes through the body of the closed retroreflector while reflecting from the reflective wall surfaces and exits the body of the retroreflector parallel to the incident beam.

The beam arms 32 and 34 include five segments 74a-74e and 76a-76e, respectively, all of which extend in sequence from the beam splitter 42 to the beam combiner 44. The beam splitter 42 delivers the light beam 26 into the first segment 74a of the beam arm 32. The light beam 26 in the first segment 74a impinges upon and reflects from the retroreflector 70a into the second segment 74b of the beam arm 32. Light from the second segment 74b impinges upon and reflects from the upward facing retroreflector 72c of the lower test mass 24 into the third segment 74c of the beam arm 32. Light from the third segment 74c impinges upon and reflects from the downward facing retroreflector 72b of the upper test mass 22 into the fourth segment 74d of the beam arm 32. Light from the fourth segment 74b impinges upon and reflects from the retroreflector 70b into the fifth segment 74e of the beam arm 32 leading to the beam combiner 44.

The beam splitter 42 delivers the light beam 28 into the first segment 76a of the beam arm 34. The light beam 28 in the first segment 76a impinges upon and reflects from the downward facing retroreflector 72d of the lower test mass 24 into the second segment 76b of the beam arm 34. Light from the second segment 74b impinges upon and reflects from the retroreflector 70c into the third segment 76c of the beam arm 34. Light from the third segment 76c impinges upon and reflects from the retroreflector 70d into the fourth segment 76d of the beam arm 34. The upward facing retroreflector 72a of the upper test mass 22 reflects the light from the fourth segment 76d into the fifth segment 74e of the beam arm 34 leading to the beam combiner 44.

An important aspect of the optical geometric arrangement shown in FIGS. 1 and 2 is that the light beams 26 and 28 each reflect from one upward facing retroreflector of one test mass and from one downward facing retroreflector of the other test mass. Specifically, the light beam 26 reflects from the upward facing retroreflector 72c of lower test mass 24 and the downward facing retroreflector 72b of the upper test mass 22, and the other light beam 28 reflects from the downward facing retroreflector 72d of the lower test mass 24 and the upward facing retroreflector 72a of the upper test mass 22.

The slightly different effects of gravity on the test masses 22 and 24 during their simultaneous freefall would change the lengths of the beam arms 32 and 34, if the effects of the present invention were not utilized. The relative change in the lengths of the beam arms 32 would be four times the amount of relative physical separation of the test masses 22 and 24 during simultaneous freefall, as explained below. The relative change in length describes an amplification factor. The amplification factor of four facilitates recognition of the light intensity changes by the detector 50. The amplification factor of four also facilitates a faster control loop response executed by the feedback control system 41 (FIG. 3) to achieve and maintain equality in the optical path length of the beam arms 32 and 34.

This relationship of the four times change in relative length of the beam arms 32 and 34 relative to the physical separation distance of the test masses 22 and 24 is demonstrated by the following mathematical derivation, which is presented below without regard to the effects of the dynamic optical path length adjustment elements 35 (FIG. 1) and 37 (FIG. 2).

When the lower test mass 24 falls a distance $Z_L$, the beam arm 34 is shortened by a distance, $2Z_L$, because the downward movement of the test mass 24 shortens each beam arm segment 76a and 76b by the amount $Z_L$, resulting in shortening of the overall length of the beam arm 34 by the distance $2Z_L$. Simultaneously, the other beam arm 32 is lengthened by the same amount, $2Z_L$, because each beam arm segment 74b and 74c is lengthened by the amount $Z_L$, resulting in lengthening of the overall length of the beam arm 32 by the distance $2Z_L$. Similarly, if the upper test mass 22 falls a distance of $Z_u$, the beam arm 34 is lengthened by a distance of $2Z_u$, because the downward movement of the test mass 22 lengthens each of the beam arm segments 76d and 76e by the amount $Z_u$, resulting in lengthening the overall beam arm 34 by the distance $2Z_u$. Simultaneously, the other beam arm 32 is shortened by the same amount $2Z_u$, because the beam arm segments 74c and 74d are each shortened by the amount $Z_u$, resulting in shortening the overall beam arm 32 by the distance $2Z_u$.

When both test masses 22 and 24 fall freely at the same time, the length or optical path distance of the beam arm 34 will be changed by the difference of the changes in the beam arm 34 caused by each of freely falling test masses 22 and 24. That changed amount, referred to as $\Delta BA_{34}$ is equal to $2Z_u-2Z_L$, or $2(Z_U-Z_L)$. Similarly, the length or optical path distance of the beam arm 32 will be changed by the difference of the changes in the beam arm 32 caused by each of the freely falling test masses 22 and 24. That changed amount, referred to as $\Delta BA_{32}$ is equal to $2Z_L-2Z_u$, or $2(Z_L-Z_U)$.

When light beams 26 and 28 from the two changed-length beam arms 32 and 34 are combined by the beam combiner 44, the combined output light beam 46 contains a sinusoidal interference fringe signal whose phase is given by the difference in path length of the two beam arms 32 and 34, not taking into account the path length adjustment of the present invention. The difference in optical path length of the two beam arms 32 and 34, referred to herein as $\Delta L$, is equal to the difference in change in length of the two beam arms 32 and 34, i.e. $\Delta BA_{34}$ and $\Delta BA_{32}$, respectively. Stated mathematically, $\Delta L=\Delta BA_{34}-\Delta BA_{32}$, or $\Delta L=2(Z_U-Z_L)-2(Z_L-Z_U)$, or $\Delta L=4(Z_U-Z_L)$.

Figure 4:
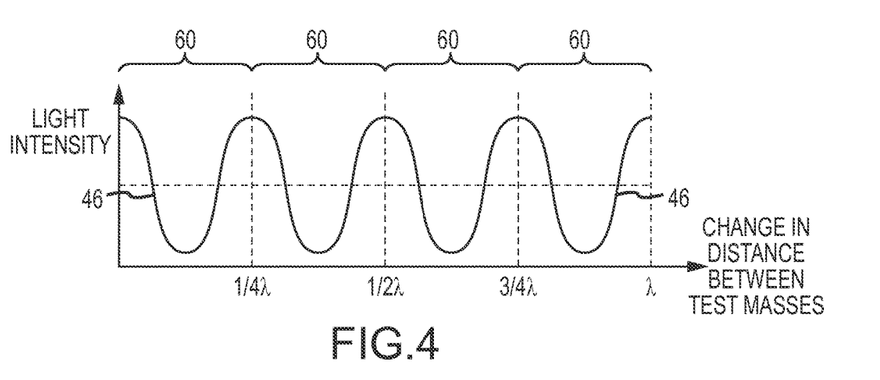
FIG. 4 is a generalized illustration of interferometric fringes shown in relation to optical path length changes, which would occur in the gradiometers shown in FIGS. 1 and 2, without using the present invention.

This mathematical development shows that, were it not for the path length adjustment of the present invention, a sinusoidal interference fringe signal would occur that has a phase change equal to 4 times the relative difference in the free-fall distances of the two freely falling test masses. This relationship is shown in FIG. 4, where four interference fringes 60 in the output light beam 46 occur for each relative change in distance between the two test masses equal to one wavelength ($\lambda$) of the input light beam 38 (FIGS. 1 and 2).

The relationship of the number of fringes 60 relative to the change in the light beam path lengths caused by movement of the test masses also confirms the amplification factor. Four fringes 60 result from the interferometric combination of the light beams 26 and 28 for each relative wavelength difference in path lengths of the two beam arms 32 and 34 while the test masses 32 and 34 freefall simultaneously, apart from the effects of the present invention. The amplification factor of four from the gradiometer 20 is twice the amplification factor from a normal Michelson interferometer of the type used in most absolute gravimeters such as the one described in U.S. Pat. No. 5,351,122.

The lengths of the beam arms 32 and 34 are equal to one another at one point where the test masses 22 and 24 experience simultaneous freefall. Preferably the equality in lengths of the beam arms 32 and 34 occurs when the test masses first commence simultaneous freefall. The beam arms 32 and 34 are calibrated to the equal lengths by adjusting the vertical position of the retroreflector 70d in the beam arm 34. The position of the retroreflector 70d is adjusted by manipulation of an adjustment device, such as a micrometer screw 78, which extends through the housing 80. Adjusting the vertical position of the retroreflector 70d changes the length of the beam arm segments 76c and 76d, and therefore changes the entire length of the beam arm 34.

A multiple frequency light beam, such as a Mercury band limited light beam, is used as the input light beam 38 for purposes of establishing the equal lengths of the beam arms 32 and 34. The test masses are positioned stationarily by the elevator 29 at a position that they would occupy when the test masses commence falling freely. So long as the beam arms 32 and 34 are not equal in length, optical fringes will result in the output light beam 46 in response to the multiple frequency input light beam. When the length of the beam arm 34 is adjusted to equal the length of the beam arm 32, by adjusting the position of the retroreflector 70d with the micrometer screw 78, the output light beam 46 will no longer include any optical fringes.

The elevator 29 is controlled by the controller/processor 52 to vary the acceleration, velocity, direction and position of the support devices 31. To release the test masses 22 and 24 to fall freely, the elevator 29 moves the support devices 31 downward at an acceleration rate which is greater than the acceleration of gravity. The controller/processor 52 recognizes the point when the downward movement of the support devices 31 exceeds the acceleration of gravity, thereby establishing the point of simultaneous freefall of the test masses 22 and 24. After the test masses have been released to fall freely, the controller/processor 52 controls the elevator 29 to establish the acceleration and velocity of the support devices 31 to allow the test masses 22 and 24 to remain in freefall for a predetermined amount of time. Thereafter, the controller/processor 52 controls the elevator 29 to retard the acceleration of the support devices 31 and allow the test masses 22 and 24 to regain contact with the support devices 31, thereby catching the test masses after simultaneous freefall. The elevator 29 then raises the support devices 31 in readiness to again release the test masses for freefall.

The electro-mechanical dynamic optical path length adjusting element 35 shown in FIG. 1 experiences a change in physical dimension in response to the magnitude of the control signal 39. One example of such an electro-mechanical component is a conventional piezoelectric crystal. A piezoelectric crystal has the property of mechanically changing a physical dimension in response to the magnitude of a control signal, e.g. 39, applied to it. That change in physical dimension, shown as a double headed vertical arrow in FIG. 1, moves the retroreflector 70*d* and changes the physical length of the beam arm 34. In addition to piezoelectric crystals, other types of electro-mechanical components have the capability of changing a physical dimension in response to a control signal.

The extent of movement available from the piezoelectric crystal is sufficient to move the retroreflector 70*d* the necessary distance to maintain the physical length of the beam arm 34 equal to the physical path length to the beam arm 32 during the course of simultaneous freefall test masses 22 and 20. A large amount of movement is not required, because the difference in path lengths 32 and 34 caused by the slightly increased physical separation of the test masses 22 and 24 at the end of simultaneous freefall is very small, typically a fraction of the wavelength of the input light beam 38. Furthermore, the change in physical dimension occurs quickly enough to achieve the necessary change in the length of the beam arm 34 as the test masses freefall. The physical equality in the lengths of the beam arms 32 and 34 also results in optical equality in the lengths of the beam arms 32 and 34.

The electro-optical dynamic optical path length adjusting element 37 shown in FIG. 2 experiences a change in optical properties in response to the magnitude of the control signal 39. One example of such an electro-optical component is a conventional Pockels cell. A Pockels cell has the property of rotating or slowing a light beam traversing through it, to a degree related to the magnitude of a control signal, e.g. 39, applied to it. Rotation or delay creates a phase change in the optical beam, and that phase change alters its advancement or propagation. Altering the propagation through the Pockels cell has the same optical effect as changing the optical path length. In addition to Pockels cells, other types of electro-optical components have the capability of altering the phase or propagation in response to a control signal.

The extent of phase change or propagation available from the Pockels cell is sufficient to maintain the beam arm 34 equal in optical path length to the beam arm 32. A large change in phase or propagation is not required, because the difference in path lengths 32 and 34 caused by the slightly increased physical separation of the test masses 22 and 24 at the end of simultaneous freefall is very small. Furthermore, the change in phase or propagation occurs quickly enough to achieve the necessary change in optical path length of the beam arm 34 as the test masses freefall.

The magnitude of the control signal 39 supplied by the control system 41 varies in relation to the intensity of the output beam 46 at the instant of time when the test masses commence or experience simultaneous freefall. The light intensity of the output beam 46 at the commencement of simultaneous freefall is illustrated by the magnitude 82 shown in FIG. 5. The magnitude 82 of the output beam 46 at the time that the test masses commence simultaneous freefall is represented by the magnitudes of the combined light beams 26 and 28, because at that time the optical path length of the beam arms 32 and 34 are equal and no fringes or phase differences in the light beams 26 and 28 (FIGS. 1 and 2) exist when the optical path lengths of the beam arms 32 and 34 are equal. As the physical path lengths of the beam arms 32 and 34 change from this equality, the magnitude of the output signal 46 will attempt to vary in a manner shown in FIG. 5 by the longer dashed lines 84. The oscillatory shape represented by the dashed lines 84 is identical to that of the fringes 60 (FIG. 4), because in essence fringes result from variations in the optical path lengths of the beam arms 32 and 34.

The optical path control system 41 (FIG. 3) controls the dynamic optical path length adjusting elements 35 (FIG. 1) and 37 (FIG. 2) to maintain the optical path length of the beam arm 34 equal to the optical path length of the beam arm 32. The control system 41 utilizes conventional feedback principles to do so and is preferably implemented within the controller/processor 52 (FIGS. 1 and 2). The basic control functionality of the control system 41 is illustrated in FIG. 3 by analog circuit components, but the same functionality can also be performed by executing digital code programs.

The signal 82 (FIG. 5) representing the magnitude of the output beam 46 when the optical path lengths are equal at the moment of commencement of simultaneous freefall, is captured, held and applied as the reference value 43 to one input terminal of a differential amplifier 86 of the control system 41, as shown in FIG. 3. The other signal 84 (FIG. 5) applied to the other input terminal of the differential amplifier 86 is the dynamic value 45. The dynamic value 45 is derived from the output of the detector 50 after the test masses 22 and 24 commence simultaneous freefall. The magnitude of the dynamic value 45 varies along the dashed line 84 shown in FIG. 5, according to the amount of deviation of the optical path length of the beam arm 34 relative to the optical path length of the beam arm 32.

Figure 5:
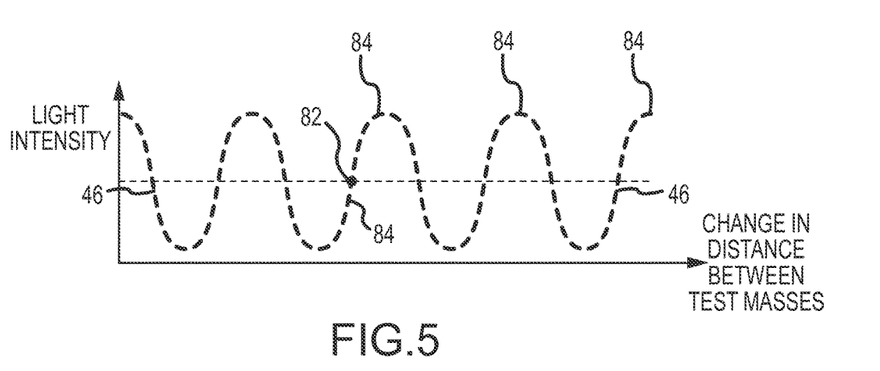
FIG. 5 is an illustration similar to FIG. 4, illustrating a reference value shown by a solid line and a dynamic value in relatively long dashed lines, which are used by the optical path control system shown in FIG. 3.

Any difference between the reference value 43 and the dynamic value 45 is amplified by the differential amplifier 86 and is supplied as the control signal 39. The magnitude of the control signal 39 causes the dynamic optical path length adjusting element 35 or 37 to adjust the optical path length of the beam arm 34 in response to the magnitude of the control signal 39. The change in optical path length of the beam arm 34 changes the length of the optical path traversed by the light beam 28. When the light beams 26 and 28 are combined in the beam combiner 44 to create the output light beam 46, the extent to which the optical lengths of the beam arms 32 and 34 are not equal will be reflected by the difference between the dynamic signal 84 and the reference signal 82 (FIG. 5).

The difference between the reference and dynamic signals 82 and 84 (FIG. 5) constitutes an error signal which is detected by the detector 50 and supplied to the differential amplifier 86 as the dynamic value 45. The differential amplifier 86 adjusts the control signal 39 until the dynamic optical path length adjusting element 35 (FIG. 1) or 37 (FIG. 2) establishes optical equality in the beam arms 32 and 34. Any difference between the dynamic value 45 and the reference value 43 is amplified to change the magnitude of the control signal 39 until equality in the optical path lengths of the beam arms 32 and 34 is achieved. Since the optical path length of the beam arms 32 and 34 will continue to change during the simultaneous freefall of the test masses, due to the slightly increasing physical distance between the test masses 22 and 24, the magnitude of the control signal 39 continues to change during the course of simultaneous freefall.

At the end of the simultaneous freefall of the test masses, the magnitude of the control signal 39 is captured. The magnitude of the captured control signal 39 at the end of simultaneous freefall is directly related to the gradient of gravity experienced by the test masses 22 and 24 during simultaneous freefall. The magnitude of the control signal 39 captured at the end of simultaneous freefall is scaled, and that value is supplied as the display signal 53 to the display 54 (FIGS. 1 and 2). The display 54 presents the value of the gradient of gravity.

Figure 6:
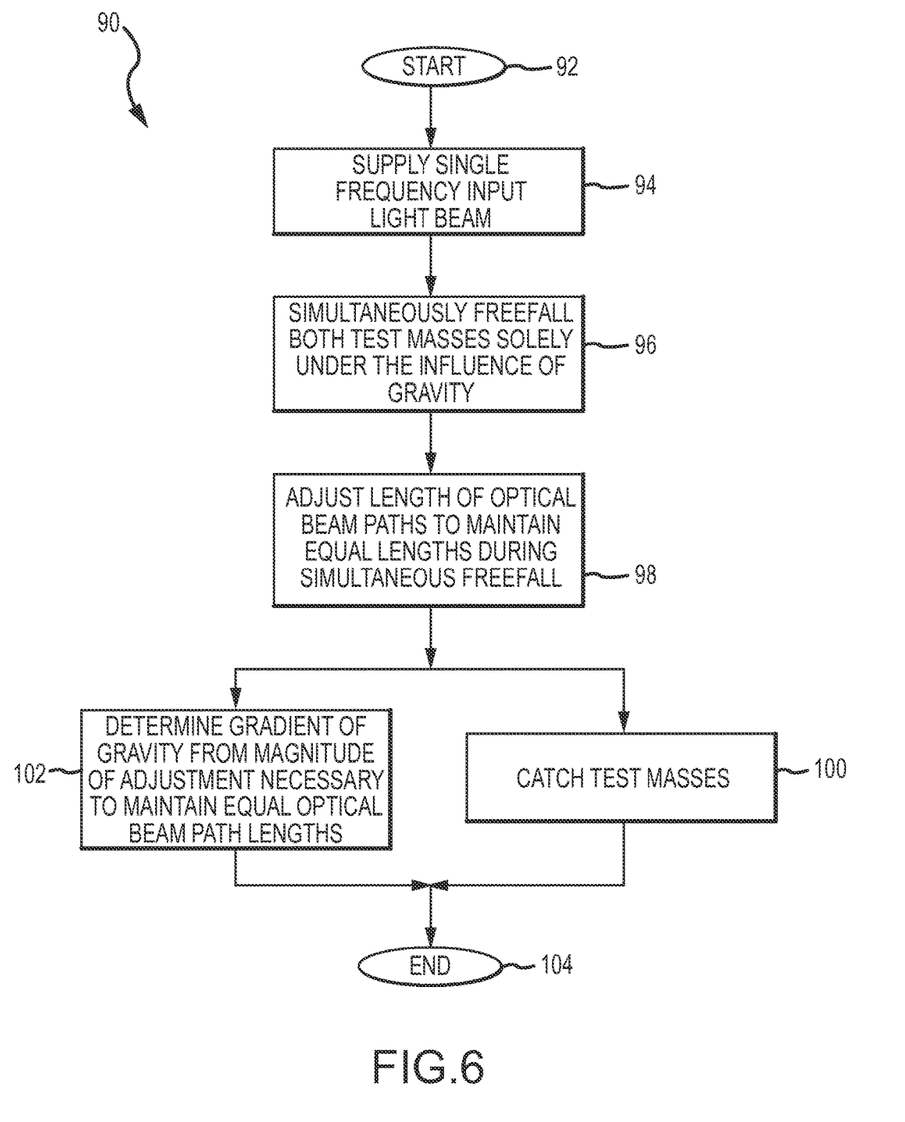
FIG. 6 is a flow chart of a process flow employed in measuring a gradient of gravity in accordance with the present invention by using the gradiometers shown in FIGS. 1 and 2.

An exemplary process flow 90 for determining the gradient of gravity using a single constant-frequency input light beam in the gradiometers 20 and 20a is illustrated in FIG. 6. The process flow 90 is described in relation to some of the components previously described in conjunction with FIGS. 1-5.

The process flow 90 begins at 92. At 94, a single frequency input light beam 38 is supplied from a single laser or other constant-frequency light source 36. At 96, the test masses 22 and 24 are released for simultaneous freefall when the optical path lengths of the beam arms 32 and 34 are equal. Both test masses are allowed to freefall simultaneously solely under the influence of gravity at 96. Simultaneously, while both test masses are freefalling, the optical path length of the beam arm 34 is adjusted by the optical path control system 41 to maintain equality with the optical path length of the beam arm 32, as shown at 98. The simultaneous freefall of the test masses is terminated at 100 by operating the elevator 29, the elevator frame 30 and the support devices 31 to catch the test masses at the end of their simultaneous freefall. At 102, the magnitude of the control signal 39 which was required to maintain equality in the optical path lengths of the beam arms 32 and 34 is captured, at the point when the simultaneous freefall of the test masses terminates. Because the magnitude of the control signal 39 captured at 102 is directly related to the gradient of gravity, the magnitude of the captured control signal 39 is scaled and supplied as the display signal 53 to the display 54. The display signal 53 represents the measured gradient of gravity. Thereafter the process flow ends at 104.

The process flow 90 may be repeated to obtain repetitious sequential measurements of the gradient of gravity, and those values may thereafter be averaged if desired to provide more uniformity in measurement.

One of the benefits of the present invention is that the gradient of gravity is readily determined from the magnitude of the control signal 39. The magnitude of the gravity gradient is not dependent upon creating one or more fringes, as is the case previously where multiple fringes were typically required to obtain enough information to make a reliable calculation of the gravity gradient.

Even though the optical path lengths of the beam arms 32 and 34 are maintained equal in accordance with the present invention, the increased amplification factor is still applicable and is used advantageously in the present invention. The higher amplification factor causes any developing differences in the optical path length of the beam arms 32 and 34 during the simultaneous freefall the test masses 22 and 24 to be recognized more responsively, thereby facilitating the rapid determination of the appropriate value of the control signal 39. As a consequence, the optical path lengths of the beam arms 32 and 34 are more precisely maintained equal during the simultaneous freefall of the test masses 22 and 24, thereby yielding a more accurate value of the gradient of gravity.

The beam arms 32 and 34 within the vacuum chamber 27 are inherently parallel to one another during simultaneous freefall of the test masses 22 and 24, as understood from FIGS. 1 and 2. If the beam arms 32 and 34 were not parallel to one another, the non-parallel deviation of the beam arms 32 and 34 would cause different optical path lengths of the beam arms. Differences in optical path lengths of non-parallel beam arms would lead to errors in determining the gradient of gravity.

The use of a parallel surface beam splitter 42 and a parallel surface beam combiner 44 contributes to the parallelism in the beam arms 32 and 34. An inherent characteristic of the parallel surfaces of the beam splitter 42 is that the two light beams 26 and 28 are delivered in a parallel relationship. Furthermore, the two light beams 26 and 28 extend in a parallel relationship with the input light beam 38. A similar situation exists with respect to the beam combiner 44, since the beam combiner 44 is a beam splitter used for the opposite purpose. The optical characteristics of the beam combiner 44 are the same as the beam splitter 42, causing parallel light beams 26 and 28 leaving the beam arms 32 and 34 to be combined accurately in the single output beam 46 while preserving their relative phase relationship. The beam combiner 44 delivers the output signal 46 in parallel relationship to the light beams 26 and 28 traversing the beam arms 32 and 34.

The parallel surface beam splitter 42 and the parallel surface beam combiner 44 also contribute to maintaining the previously-described substantial equality in the optical path lengths. An inherent characteristic of the parallel surface beam splitter 42 and beam combiner 44 is that the optical path length of the first light beam 26 in the beam splitter 42 added to the optical path length of the first light beam 26 in the beam combiner 44 is equal to the optical path length of the second light beam 28 in the beam splitter 42 added to the optical path length of the second light beam 28 in the beam combiner 44. As a consequence, the light beams passing through the parallel surface beam splitter 42 and beam combiner 44 retain a substantial equality in optical path length in the beam arms 32 and 34.

The use of conventional corner cube retroreflectors 70a-70d and 72a-72d also contributes to the parallelism. Changes in direction of the light beams 26 and 28 within the vacuum chamber 27 are achieved only by the retroreflectors 70a-70d and 72a-72d. Use of the retroreflectors to change the direction of the light beams ensures parallelism in the beam arms 32 and 34, thereby maintaining equal path lengths. The manner in which a conventional corner cube retroreflectors 70a-70d and 72a-72d maintain the parallelism is described in detail in the above referenced U.S. patent application Ser. Nos. 13/558,138 and 13/564,548. In essence, an optical characteristic of each retroreflector is that an angular relationship of its reflective wall surfaces always projects that reflected exit light beam parallel to the incident light beam. This parallel reflection quality causes the light beams in the beam arm segments 74b-74e and 76b-76e (FIG. 1) to remain parallel with respect to one another and maintain the substantially equal optical path lengths in the beam arms 32 and 34.

Using the retroreflectors 72a-72d on the test masses 22 and 24 avoids the spurious effects from unintended random rotation of the test masses 22 and 24 during freefall. The test masses 22 and 24 are subject to random rotation while freefalling due to spurious perturbations or vibrations of the housing 80 at the instant when the test masses 22 and 24 are released into freefall. Unintended random rotation of the test masses during freefall does not change the lengths of the beam arms 32 and 34, for the reasons discussed in the above referenced U.S. patent application Ser. No. 13/558,138 and 13/564,548, and generally summarized below.

The retroreflectors 72a, 72b and 72c, 72d are positioned on the test masses 22 and 24, respectively, with the light beam entry-exit surfaces facing in opposite directions and parallel with one another. Optical center points of the retroreflectors 72a, 72b and 72c, 72d are located equidistantly from and on opposite sides of the center of mass points of the test masses 22 and 24, respectively. The two optical center points and the center of mass point of each test mass are located co-linearly. In this configuration, the distance from the center of mass point to the optical center point of the retroreflector 72a or 72c is equal to the distance from the center of mass point to the optical center point of the retroreflector 72b or 72d, in each test mass 22 and 24, respectively.

If either test mass rotates while freefalling, rotation will occur about the center of mass point because the test mass cannot rotate about any other point. Rotation about the center of mass point causes the optical center points of both retroreflectors on the test mass to rotate in the same amount and in the same rotational direction relative to the center of mass point. The similar rotation causes the parallel light beams which impinge on the retroreflectors to be affected equally in their lengths. Consequently, rotation of either test mass does not adversely affect the relative lengths of the beam arms 32 and 34, because such rotation has the same effect on the length of both beam arms 32 and 34. Since the beam arms 32 and 34 change length by the same amount when either test mass rotates, the accuracy of measurement is not adversely affected.

Many significant improvements result from the present invention. The gradient of gravity may be measured without performing complex interferometric analysis, processing and calculations which typically require the generation of multiple fringes to obtain an accurate value of the gravity gradient.

A high level of effective common mode rejection is achieved resulting in the amelioration or elimination of most external noise influences. The adverse influences of unintended external perturbations and noise equally affects both of the equal length and parallel beam arms 32 and 34, causing those adverse influences to be rejected or canceled when the light beams 26 and 28 are combined. Any frequency and phase shifts from the single laser light source 36 are present equally in the light beams 26 and 28 conducted in the beam arms 32 and 34, and are therefore canceled by common mode rejection when the light beams 26 and 28 are combined in the single output light beam 46. Common mode rejection of laser frequency or phase changes or movements of the input optical fiber 40, the input light beam splitter 42 or the optical fiber 48 is obtained when these disturbances travel through both beam arms 32 and 34 and cancel when the beams 26 and 28 are combined at the beam combiner 44 as the output light beam 46.

The amplification factor of four, which is achieved by reflecting both light beams in both beam arms 32 and 34 from both test masses 22 and 24, facilitates deriving the control signal 39 on a very responsive basis, thereby requiring a lesser amount of freefall distance or achieving an accurate value of the gravity gradient. The higher amplification factor allows the gradiometer to be made smaller and more compact.

Many other advantages and improvements will become apparent upon fully appreciating the many aspects of the present invention. Presently preferred embodiments of the present invention and many of its improvements have been described with a degree of particularity. This description is preferred examples of implementing the invention, and is not necessarily intended to limit the scope of the invention. The scope of the invention is defined by the scope of the following claims.

What is claimed:

1. A gradiometer for measuring a gradient of gravity between two predetermined separated locations using first and second light beams, comprising:
   first and second test masses which are released for simultaneous freefall solely influenced by the gravity whose gradient is measured, each test mass released for freefall at a different one of the two separated locations;
   an arrangement of optical elements which directs the first and second light beams to traverse first and second separate and different beam arms respectively, each beam arm having an optical path length along which the light beam traverses, the first beam arm directing the first light beam to impinge upon and reflect from at least the first test mass during the simultaneous freefall of both test masses, the second beam arm directing the second light beam to impinge upon and reflect from at least the second test mass during the simultaneous freefall of both test masses;
   the arrangement of optical elements interferometrically combining the first and second light beams into an output light beam after the first and second light beams have traversed the first and second beam arms during the simultaneous freefall of both test masses;
   a dynamic optical path length adjusting element located within one of the beam arms and operative in response to an applied control signal to change the optical path length of the one beam arm in a predetermined relation to a magnitude of the applied control signal; and
   an optical path control system receptive of the output light beam while the test masses freefall simultaneously and operative to supply the control signal at a magnitude which causes the dynamic optical path length adjusting element to maintain the optical path length of the one beam arm equal to the optical path length of the other beam arm during the simultaneous freefall of the test masses; and wherein:
   the magnitude of the control signal directly defines the gradient of gravity.

2. A gradiometer as defined in claim 1, further comprising:
   a processor receptive of the control signal and operative to directly scale the magnitude of the control signal into a value describing the gradient of gravity.

3. A gradiometer as defined in claim 1, wherein:
   the control signal supplied by the optical path control system is an electrical control signal;
   the magnitude of the control signal is represented by a magnitude of the electrical control signal;
   the arrangement of optical elements includes a reflector having a position within the one beam arm;
   the dynamic optical path length adjusting element comprises an electro-mechanical element which responds to the electrical control signal to change in physical dimension in a predetermined manner in response to the magnitude of the applied electrical control signal; and the electro-mechanical element is connected to transfer the change in physical dimension to the reflector to change the position of the reflector in the one beam arm and thereby change the optical path length of the one beam arm.

4. A gradiometer as defined in claim 3, wherein:
the electro-mechanical element comprises a piezoelectric crystal.

5. A gradiometer as defined in claim 1, wherein:
the control signal supplied by the optical path control system is an electrical control signal;
the magnitude of the control signal is represented by a magnitude of the electrical control signal;
the dynamic optical path length adjusting element comprises an electro-optical element positioned within the one beam arm to optically control propagation of the light beam through the one beam arm in response to the magnitude of the applied electrical control signal; and
the electro-optical element changes the propagation of the light beam through the one beam arm to change the optical path length traversed by the light beam of the one beam arm.

6. A gradiometer as defined in claim 5, wherein:
the electro-optical element comprises a Pockels cell.

7. A gradiometer as defined in claim 1, wherein:
the optical path control system is receptive of the output light beam at commencement of the simultaneous freefall of the test masses and while the test masses freefall simultaneously; and
the optical path control system supplies the control signal at a magnitude which maintains a characteristic of the output light beam while the test masses freefall simultaneously substantially equal to a characteristic of the output light beam at commencement of the simultaneous freefall of the test masses.

8. A gradiometer as defined in claim 1, further comprising:
a single vacuum chamber in which both the first and second test masses freefall.

9. A gradiometer as defined in claim 1, wherein:
the arrangement of optical elements orients the first and second beam arms in parallel relation with one another.

10. A gradiometer as defined in claim 9, wherein:
the first and second test masses freefall in parallel paths; and
the arrangement of optical elements orients the first and second parallel beam arms parallel to the parallel freefall paths of the first and second test masses.

11. A gradiometer as defined in claim 1, further comprising:
a source of a constant-frequency input light beam; and
wherein the arrangement of optical elements includes:
a beam splitter which receives the input light beam and optically splits the input light beam into the first and second light beams and directs the first and second light beams in the first and second beam arms, respectively; and
a beam combiner which receives the first and second light beams from the first and second beam arms after impingement upon and reflection from the test masses and which combines the first and second light beams from the first and second beam arms into the output light beam.

12. A gradiometer as defined in claim 1, wherein:
the first beam arm directs the first light beam to impinge upon and reflect from both the first and second test masses during the simultaneous freefall of both test masses; and
the second beam arm directs the second light beam to impinge upon and reflect from both the first and second test masses during the simultaneous freefall of both test masses.

13. A gradiometer as defined in claim 1, wherein:
each test mass has a first reflective surface oriented in the same direction of freefall and a second reflective surface oriented in the opposite direction of freefall;
the arrangement of optical elements includes the first and second reflective surfaces of both test masses;
the arrangement of optical elements directs the first light beam in the first beam arm to impinge upon and reflect from the first reflective surface of one test mass and the second reflective surface of the other test mass; and
the arrangement of optical elements directs the second light beam in the second beam arm to impinge upon and reflect from the second reflective surface of the one test mass and the first reflective surface of the other test mass.

14. A gradiometer as defined in claim 13, wherein:
each of the first and second reflective surfaces of each test mass comprises a retroreflector;
each retroreflector has an optical center point;
each of the first and second test masses has a center of mass point; and
the first and second retroreflectors are retained on each test mass with their respective optical center points each separated at a finite equal distance from the center of mass point, with the optical center points and the center of mass point all co-linear with one another, with the center of mass point located between the optical center points, and with the first and second retroreflectors of each test mass oriented to reflect the first and second light beams parallel to one another and in opposite directions from one another.

15. A method of measuring a gradient of gravity between two predetermined separated locations, comprising:
freefalling a first test mass at one of the two separated locations while solely influenced by the gravity whose gradient is measured;
freefalling a second test mass at the other one of the two separated locations while solely influenced by the gravity whose gradient is measured, the second test mass freefalling simultaneously during at least a portion of the time when the first test mass is freefalling;
directing a first light beam in a first beam arm to impinge upon and reflect from at least the first test mass during the simultaneous freefall of both test masses, the first beam arm having an optical path length;
directing a second light beam in a second beam arm to impinge upon and reflect from at least the second test mass during the simultaneous freefall of both test masses, the second beam arm having an optical path length;
dynamically changing the optical path length of one beam arm to maintain the optical path length of the one beam arm equal to the optical path length of the other beam arm during the simultaneous freefall of the test masses; and
directly defining the gradient of gravity by the change in the optical path length of the one beam arm required to maintain equality in the optical path lengths of the first and second beam arms during the simultaneous freefall of the test masses.

16. A method as defined in claim 15, further comprising:
combining the first and second light beams from the first and second beam arms after the first and second light beams have impinged upon and reflected from the test masses during the simultaneous freefall of the test masses, the combined first and second light beams constituting an output light beam; and
responding to a characteristic of the output light beam to change the optical path length of the one beam arm to maintain the optical path length of the one beam arm equal to the optical path length of the other beam arm during the simultaneous freefall of the test masses.

17. A method as defined in claim 16, further comprising:
using a dynamic optical path length adjusting element in one of the beam arms to change the optical path length of the one beam arm in a predetermined relationship to a magnitude of a control signal applied to the dynamic optical path length adjusting element; and
deriving the magnitude of the control signal from the output light beam.

18. A method as defined in claim 17, further comprising:
comparing a characteristic of the output light beam at commencement of the simultaneous freefall of the test masses with a characteristic of the output light beam while the test masses freefall simultaneously to derive the magnitude of the control signal.

19. A method as defined in claim 15, further comprising:
freefalling the first and second test masses in paths which are parallel to one another; and
orienting the first and second beam arms parallel to one another and to the paths in which the test masses freefall.

20. A method as defined in claim 15, further comprising:
equally changing the optical path length of the first and second beam arms arising from any rotation of either test mass during freefall.

21. A method as defined in claim 15, further comprising:
supplying the first and second light beams to the first and second beam arms, respectively, at a single frequency.

22. A method as defined in claim 15, further comprising:
directing the first light beam in the first beam arm to impinge upon and reflect from both the first and second test masses during the simultaneous freefall of both test masses; and
directing the second light beam in the second beam arm to impinge upon and reflect from both the first and second test masses during the simultaneous freefall of both test masses.

23. A method as defined in claim 15, further comprising:
directing the first light beam in the first beam arm to impinge upon and reflect from a location on the first test mass which is in the direction of freefall;
directing the first light beam in the first beam arm to impinge upon and reflect from a location on the second test mass which is in the opposite direction of freefall;
directing the second light beam in the second beam arm to impinge upon and reflect from a location on the first test mass which is in the opposite direction of freefall; and
directing the second light beam in the second beam arm to impinge upon and reflect from a location on the second test mass which is in the direction of freefall.

* * * * *